United States Patent

Yarbrough

[15] 3,701,100

[45] Oct. 24, 1972

[54] CONTROLLED ACCESS SECURITY SYSTEM

[72] Inventor: Kenneth A. Yarbrough, Dallas, Tex.

[73] Assignee: World Computer Systems Engineering Corporation

[22] Filed: Dec. 16, 1970

[21] Appl. No.: 98,613

[52] U.S. Cl..........340/149 A, 235/61.7 B, 340/147 A

[51] Int. Cl...............................................G08b 1/08

[58] Field of Search..........340/147 A, 149 R, 149 A; 179/37; 235/61.7 B

[56] References Cited

UNITED STATES PATENTS

| | | | |
|---|---|---|---|
| 3,221,304 | 11/1965 | Enikeieff et al. | 340/149 A |
| 3,394,246 | 7/1968 | Goldman | 235/61.7 B |
| 2,914,746 | 11/1959 | James | 340/149 A |
| 3,245,697 | 4/1966 | Nugent | 340/149 A X |
| 2,714,201 | 7/1955 | Whitehead | 340/149 A |
| 3,419,881 | 12/1968 | Yamamoto et al. | 340/149 AX |
| 3,499,115 | 3/1970 | Sontag | 179/37 X |
| 3,590,333 | 6/1971 | Blum | 340/149 A |
| 3,569,619 | 3/1971 | Simjian | 340/149 A X |

*Primary Examiner*—David L. Trafton
*Attorney*—Donald Gunn

[57] ABSTRACT

For use in a building to limit access to a secured area, an apparatus which includes a badge reader installed at the point of entrance, numbered badges for those desiring entrance into the secured area, a remote badge number file storage, an electronic scanner which scans the file when supplied with the number from the badge, and means for remotely electrically opening a door or other entrance to the secured area upon ascertaining authority for the badge holder to enter that particular secured area as evidenced by data from the storage file.

10 Claims, 2 Drawing Figures

PATENTED OCT 24 1972

3,701,100

Figure 1:
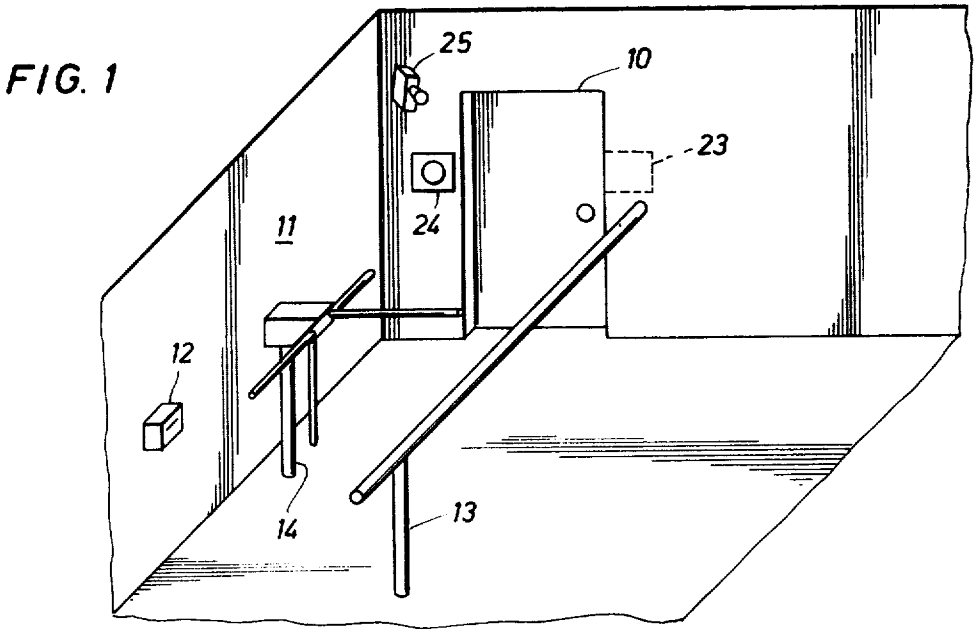

Kenneth A. Yarbrough
INVENTOR

BY Donald Gunn

ATTORNEY

CONTROLLED ACCESS SECURITY SYSTEM

SUMMARY OF PROBLEM AND SOLUTION

In large buildings, there may exist areas in which the degrees of security may vary. For instance, in a manufacturing plant, there may be various projects devoted to items of a consumer interest, projects being identified by the military as requiring a confidential status, and those which are secret or even top secret. There may be records kept in a financial institution, such as a band, brokerage house, stock broker, or the like, which require different degrees of security. For instance, cancelled checks in a bank require a lesser degree of security than do "bearer" instruments. Stock transfer departments deal with instruments which likewise require a high degree of security. From the foregoing, it will be readily understood that the degree of access permitted and the degree of security required for various areas in a building or facility may therefore be quite variable.

In the ordinary operation of an installation having secured areas, one fundamental tenet is that individuals having no need of access to a particular secured area should not normally be admitted to it. At best, this is implemented through the use of an armed guard or area supervisor. This is subject to frailties of human error, and generally lacks the consistent quality required inasmuch as the individual manning ,a particular area may vary from time to time.

The present invention is intended for use in an area where access of several individuals may be limited or discretionary in or about the facility, and where the degrees of security may likewise vary. The present invention is intended as a central monitor and control system for a security system. It preferably cooperates with one or more entrances in or about the premises. At each entrance, it preferably uses a door lock which is remotely released. For convenience, an intercom for communication and a closed circuit television system monitors each door. This conveys the necessary information to the central unit. At each entrance, a badge reader is provided. Each employee is provided with a badge having a unique employee identification number punched therein. The employee presents the badge to the badge reader, which is read by the remote badge reader, and a signal is conveyed to the central equipment. A storage file at the central equipment scans the list of badge numbers to determine whether or not the badge is valid, and if valid, whether or not that individual should be permitted to the area beyond the entrance. The apparatus can be used in conjunction with a recording device which records the time of day, notation of the particular entrance, and particular badge number of the employee gaining entrance. Should anything be discovered missing thereafter, replay of the stored data would assist in investigating the individuals having access to the area, and might aid in determining the nature of any disappearance.

Figure 2:
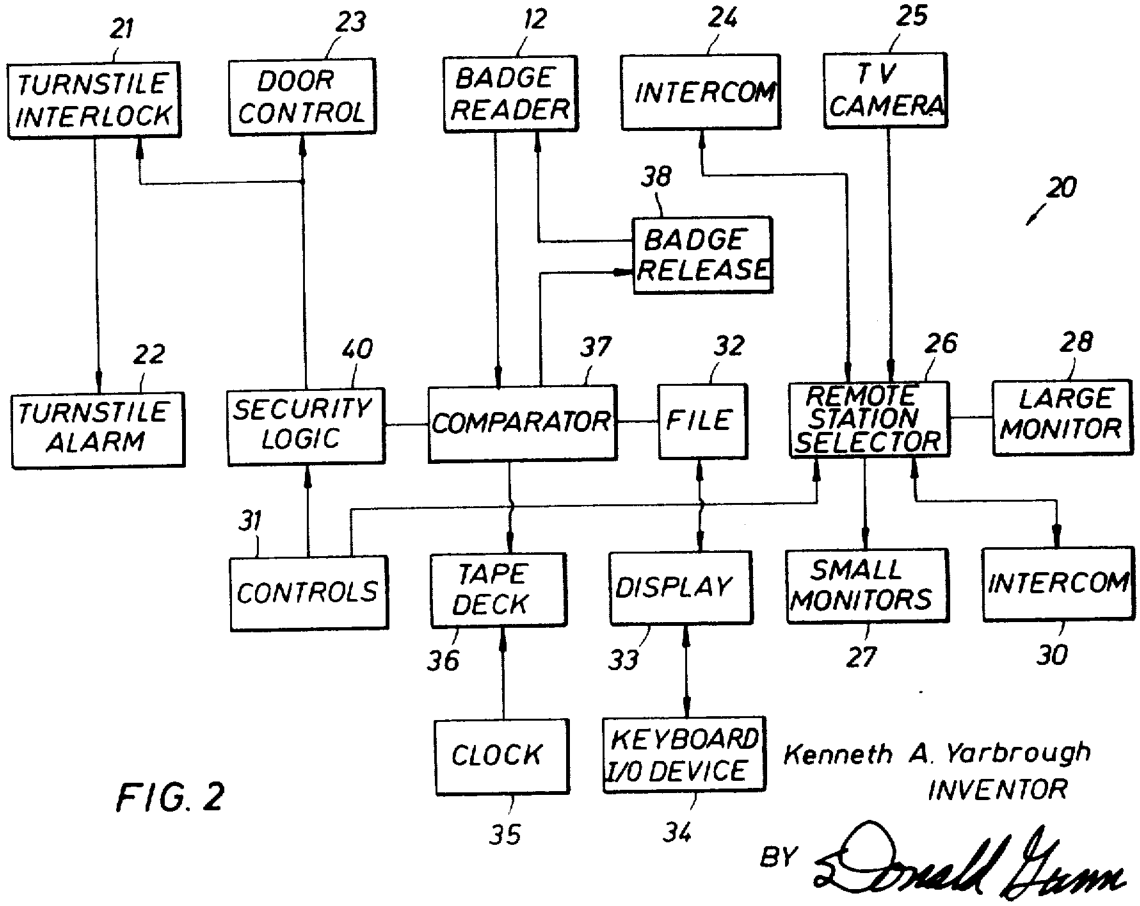

Many objects and advantages of the present invention will become more readily apparent from a consideration of the following written specification and drawings, which are:

FIG. 1 shows an individual entrance monitored with the equipment of the present invention, including a badge reader; and, FIG. 2 is a block diagram schematic of the present invention which includes multiple remote stations and a central unit.

In the drawings, attention is first directed to FIG. 1 where a door is indicated by the numeral 10. The door is located in a wall 11, or other suitable structure defining the path of an individual in the vicinity. As an individual approaches the door 10, he passes by a badge reader 12. The badge of the individual is inserted into the badge reader 12 and the number is read. The present invention tests whether or not that individual has the right to access to the area. Assuming access is granted, the door 10 is opened and the individual can pass through. If access is denied, the operator of the equipment is signalled by means of an alarm, and in the preferred embodiment, the badge of the individual is held until the supervisor has had an opportunity to investigate the circumstances of the attempted entry.

Considering the invention more in detail, the layout of FIG. 1 will be first described as a representative installation at which the equipment is located, and the central unit will be described as illustrated in FIG. 2. It will be understood that the invention is cooperative with many entrances protecting either a single or multiple secured areas, depending on the layout. In FIG. 1, a rail 13 limits traffic to the door 10 and directs it past a turnstile 14. The rail 13 and the turnstile 14 prevent a group of people from entering the door 10 when it is opened for one person having a valid badge. Spaced some distance from the door 10 is the badge reader 12. Preferably, the badge reader is positioned so that in conjunction with the walls which define the secured area, the door location, the rail 13, and the turnstile 14, that only one individual can be admitted for each operation of the badge reader. While the entrance may differ in many circumstances, it might readily include the use of a wire screen to supplement the rail 13, light beams and photocells, and other equipment. The equipment shown in FIG. 1 to limit passage of one individual for each operation of the badge reader is merely representative, and can be enhanced through the application of such means as noted above. On the other hand, this equipment may be omitted in some circumstances.

The foregoing is directed to FIG. 1 which discloses an arrangement for directing traffic toward the entrance of a secured area. In or about a premises, several such entrances may be required for several secured areas, and, of course, they may be similar to or different from one another. This will be more readily understood from a description of the central equipment which is shown in FIG. 2.

In FIG. 2, the central equipment is indicated generally by the numeral 20. By central, reference is made to the fact that it is located at a central point or location where one individual can readily monitor its operation and the traffic into and out of various secured areas. The equipment illustrated generally at 20 is connected with a minimum of one entrance, there being no practical limit on the number of entrances to the secured area cooperative with the central unit. Thus, the equipment will typically find use and application with perhaps five of 10 entrances, although a greater number is permissable. Considering the apparatus of FIG. 2 more specifically, the equipment which is located at the various remote sites is shown separate and apart from the central equipment at 20. This will typically include a turnstile interlock 21 which is connected with a turnstile alarm 22 at the central equipment. The turnstile interlock meters or measures the number of people passing through the entrance, should this be desired, and provides an indication that more than one person has advanced through the turnstile 14 shown in FIG. 1. The alarm is preferably located at the central station and responds to excessive movement through the turnstile.

The remote equipment also includes a remote door control 23. The door control is shown in FIG. 1 in dotted line as being recessed within the wall to permit remote release of the door 10. Conventionally, the door 10 is provided with a lock built into the door control 23 which releases to permit the door to be pushed open. The door is preferably also equipped with a return spring. Thus, an individual can advance to the door and push upon it when the door control 23 is actuated and the lock is released. The individual can then advance through the door and the door will swing shut and be latched through operation of the door control 23. More will be noted concerning the actuation of the door control and associated equipment hereinafter.

The badge reader 12 was previously mentioned and its function will be noted in detail hereinafter.

An intercom 24 is also shown in FIG. 2. The intercom 24 is also shown in FIG. 1. The intercom 24 is typically in the form of a speaker mounted near or at the door as shown in FIG. 1. The intercom 24 permits two-way verbal communication between the person wishing access to the secured area and the person who monitors the equipment at the central location.

The numeral 25 in FIG. 2 identifies a closed circuit television camera which is also shown in FIG. 1. The camera is preferably located at a point to be focused on the face of an individual approaching the door. It is preferably positioned to view an individual at the door, those passing through the turn-stile, and those operating the badge reader 12. The television camera 25 is customarily used by an individual manning the central equipment to survey the situation and, in case of an individual seeking admission to an area where such admission is denied, to scan and interrogate the individual.

As also shown in FIG. 2, the central station 20 incorporates a remote station selector 26 which is connected to the intercom 24 and television camera 25. Ordinarily, the operator of the central equipment will not desire to hear or see the activities at all of the remote stations at one time. Hence, he is provided with a remote station selector for use in selecting the various entrances which are to be monitored at a particular time. The remote station selector permits switching from one intercom or television camera to another. Several small television monitors are provided at 27, and a large television monitor is located at 28. For convenience, the number may be altered depending on the number of secured entrances to be monitored, and the amount of traffic through the entrances. Additionally, the intercoms 24 at each of the entrances are switched through the remote station selector 26 to an intercom terminal at 30 to permit the operator to converse with a selected station. The remote station selector is operated through the agency of central unit controls which are indicated at 31 in FIG. 2.

The central unit 20 incorporates a magnetic disc storage file at 32. The magnetic disc storage file is preferred over magnetic tape or a core memory because of cost and because access time is quite favorable. Disc files are available with access time no greater than about 16 milliseconds. A serially written tape might have shorter access time should the number of entries be small, but quite often, the number of entries would be sufficiently large that a disc file would provide the desired access time. The disc file is used to store badge numbers assigned to various individuals. The present invention utilizes the unique badge number assigned to each individual to determine whether or not access to a given area should be permitted or denied. The individual is given a unique badge number at the time of his employment, and the number of secured areas which are permitted to him are likewise identified. The secured areas may be identified by assigning an appropriate number to the various entrances. Thus, in a facility with ten entrances monitored by the present invention, the individual may be permitted access to some of the 10. The file 32 is utilized to store his unique badge number and the areas to which he may be admitted. The nonselected areas are not indicated in the file.

In some installations, the secured areas may have an order of ascending significance. This will be analogous to an installation having governmental clearances which are confidential, secret, and top secret. It may well occur that some individuals are admitted to confidential areas only, and hence, these numbers can be entered in the file. Some individuals may be admissable to all areas, and hence, all numbers can be entered in the file. The exact numbering system chosen for a given installation of the security equipment of the present invention is subject to variation, but it should be appreciated that a system based on entry of code symbols within the file 32 for each individual is utilized with the present invention to permit or deny access of an individual to a given area.

The file 32 is connected with a display unit 33 which is also connected to a keyboard 34. The keyboard 34 is utilized to enter new data which is first displayed by a visual display 33 into the file 32. Thus, a new employee might be hired and assigned a newly created badge number. The badge number and areas or entrances for which access is permitted are entered through the keyboard 34 into the display 33, and into the file 32. This data is thus placed in the memory, thereby permitting the equipment to respond instantly to the hiring of the new employee.

The central unit 20 further includes a clock 35 which is connected with a tape memory system 36. The tape memory system records data from the clock 35 periodically, and records data from a comparator 37 whose purpose will be described in detail hereinafter.

The comparator 37 is connected with several badge readers 12, one at each entrance. The badge readers are similar, and hence, it is believed that a generalized representation of only one is required for the drawings. The several similar badge readers all form signals indicative of the badge of the individual seeking admission to the secured areas. Thus, the badge reader forms what may typically be a multidigit signal, perhaps from four to 10 digits, describing the individual seeking entrance. The signal is supplied from the remote entrance to the comparator 37. The comparator 37 scans the file 32 electronically and determines whether or not the badge number is, indeed, a valid badge number. Moreover, the comparator 37 forms a signal to a badge release circuit 38 which is then returned to the badge reader to release the grip which the badge reader has on the individual badge as will be described hereinafter. The comparator 37 thus ascertains the perfect match of the badge number read by the badge reader 12 with the number stored in the file 32. Each badge reader is, of course, affiliated with an individual entrance. The comparator 37 therefore compares the identification of the individual badge reader 12 with the designations recorded in the file 32. Again, if a comparison is achieved, and presuming proper comparison of the badge numbers proper, then the signal is formed for the badge release circuit 38. The badge release circuit 38 causes the badge reader 12 to release the badge which has been inserted into it.

From the foregoing, it will be seen that two conditions must be properly met to permit an individual to enter a secured area through an entrance such as that illustrated in FIG. 1. The file 32 must contain his badge number and the particular entrance must be specifically be noted as an entrance permissable to the individual. As a consequence, the comparator 37 compares the two sets of data with the file information and indicates to the badge release 38 that the individual can be permitted to enter.

When the comparator operates, it forms a signal provided to the security logic 40 which is then input to the door control mechanism 23. The security logic forms a signal which permits release of the door 23. This also releases the turnstile interlock 21 to permit the individual to advance through the door. The door control mechanism 23 is thus signalled by the security logic 40 to permit entrance of the individual.

Note should be taken of the precise nature of the badge reader 12 and its mode of operation. The badge reader 12 is a bought item which is manufactured by Selectro Corp., or Amp, Inc. The badge reader responds to a plastic badge which has a code punched in it. The employee's individual number is encoded in the badge which is inserted into the badge reader. The badge reader customarily closes on the badge and holds it securely to register the badge with the reading mechanism to make an accurate and correct reading. The grip of the badge reader 12 is thus only released when the signal is provided by the badge release circuit 38. Since the hold on the badge is maintained until released, should a bogus badge be presented, it can be seized and held by the badge reader and the individual presenting it cannot easily retrieve it from the machine without tearing up the badge. The secured area is thus further protected. In the event an employee should lose his badge, he need only report the loss to receive a new badge with a new number. At that instance, the keyboard 34 can be used to enter data into the data file 32 which will cancel the prior badge number and enter the newly assigned badge number. Thus, any lost badges which are in circulation present no particular problem inasmuch as the badge reader 12 may be used to "capture" them should they be presented by an individual improperly seeking admission to the premises.

It might occur from time to time that several individuals would try to enter a secured area while only one person properly presents a badge. However, the turnstile must be coped with to be able to gather at the door 10 when it is opened for the one individual. While this might be accomplished, with some degree of difficulty, the turnstile mechanism presents a barrier to a group of people entering on a single badge reading. The turnstile may be ceiling high to prevent climbing over the typical three arms of the turnstile. Also, the rail may be quite tall. Alternatively, interlocked doors in a short hall can well serve to hold a person should a false entry be attempted. Of course, the turnstile can be omitted and a view of the entrance through the television camera 25 can be utilized to prevent more than one person from entering upon the presentation of only a single badge to the badge reader 12.

Many alterations and variations of the present invention may be readily adapted. The turnstile 14 and the rail 13 which defines the pathway to the door may be altered, modified or omitted as previously mentioned. Other structural techniques may be used in lieu of the turnstile, or the rail.

As would be appreciated, the intercom is preferably installed at each entrance, although it may be omitted due to unique circumstances. For instance, a particular entrance may be located a few feet from the point of installation of the central unit 20, and hence, the operator can readily view the entrance and may not need the intercom. The same may also be true of the remote closed circuit television camera 25.

For the use and operation of the intercom and the television camera, it may be helpful to install special speakers, microphones, remote lighting systems, and the like, which enhance their operation. These practicalities can be readily undertaken at the point of installation.

The foregoing is directed to a full and complete disclosure of the preferred embodiment of the present invention. The terminology adapted herein is extended to the claims which are appended hereto.

What is claimed is:

1. A security system for use with multiple entrances into two or more secured areas for controlling admission to the areas wherein an individual is to be admitted to all or only a part of the secured areas and wherein the areas for an individual are designated, and individuals desiring admission to the secured areas are provided with badges having numbers encoded in such a badge, comprising:

a central unit adapted to receive a data file therein for storing a list of badge numbers for which admission to a secured area is permitted and also storing a list of coded symbols representative of a plurality of secured areas to which an individual is to be selectively and controllably admitted;

therebeing at least two entrances associated with selected ones of the secured areas;

at least a pair of badge reader means connected to said central unit, said badge reader means being adapted to be installed in proximity of the entrances;

comparator means included in said central unit and supplied with signals from said badge reader means and the data list in said central unit, said comparator means comparing the signals provided thereto to determine whether or not the number indicated for the badge of an individual is listed among those for whom access to a secured area is indicated, and forming an output signal;

means connected to said comparator means and receiving the output signal for signalling to the individual presenting the badge that admission to a secured area has been determined;

means associated with each of said badge reader means for forming a unique signal indicative of particular badge reader means, said means being further connected to said central unit; and, second comparator means included in said central unit and being provided with signals from said means associated with said badge reader means and also from the data list in said central unit indicative of the particular secured areas, said second comparator means forming an indication that the individual presenting the badge to said badge reader means shall be admitted to or denied admission to a selected secured area dependent on the comparison by said second comparator means.

2. The invention of claim 1 wherein said signalling means includes a door release means cooperatively securing a door in a closed position at an entrance.

3. The invention of claim 1 wherein said signalling means includes an intercom means communicating from said control unit.

4. The invention of claim 1 wherein said signalling means includes a means for generating a badge release signal, and wherein said badge reader means seizes and holds a badge to be read thereby until receipt of a signal for release thereof.

5. The invention of claim 1 including at an entrance having a door:

a. said badge reader means being positioned outside such a door; and, b. door release means remotely controlled from said central unit for controllably releasing such door to be opened.

6. The invention of claim 5 including a turnstile and rail constructed and arranged adjacent to the door to permit entry of only one individual through such door on release thereof by said door release means.

7. The invention of claim 5 including in said central unit an intercom selectively connected therefrom with an intercom at the remote entrance.

8. The invention of claim 5 including in said central unit a television monitor selectively connected therefrom with a television camera at the remote entrance.

9. The invention of claim 7 including in said central unit a television monitor selectively connected therefrom with a television camera at the remote entrance.

10. The invention of claim 5 wherein said signalling means includes a means for generating a badge release signal, and wherein said badge reader means seizes and holds a badge to be read thereby until receipt of a signal for release thereof.

* * * * *